US006195538B1

(12) United States Patent
Owaki

(10) Patent No.: US 6,195,538 B1
(45) Date of Patent: Feb. 27, 2001

(54) RECEIVER FOR RECEIVING TEXT-BASED MULTIPLEX BROADCASTS AND STORING TEXT-BASED DATA

(75) Inventor: Masanao Owaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/987,104

(22) Filed: Dec. 8, 1997

(30) Foreign Application Priority Data

Dec. 16, 1996 (JP) .................................................. 8-353225

(51) Int. Cl.[7] .................................................... H04B 01/16

(52) U.S. Cl. .................................... 455/158.4; 455/158.5; 455/186.2; 370/486

(58) Field of Search .................................... 455/45, 158.4, 455/158.5, 166.2, 171.1, 179.1, 185.1, 186.1, 186.2; 386/95; 370/486, 487

(56) References Cited

U.S. PATENT DOCUMENTS 5,797,087 * 8/1998 Lee ................................ 455/171.1 X
5,890,053 * 8/1998 Hino et al. ......................... 455/45 X
5,905,844 * 5/1999 Kimura et al. ......................... 386/95

* cited by examiner

*Primary Examiner*—Fan Tsang
*Assistant Examiner*—Philip J. Sobutka
(74) *Attorney, Agent, or Firm*—Jay H. Maioli

(57) ABSTRACT

A FM receiver for receiving text-based multiplex broadcasts includes: a receiving circuit for receiving the text-based multiplex broadcasts; a decoding circuit for taking out the plurality of character program data from a multiplexed signal received by the receiving circuit; a display element for displaying the character program in accordance with data obtained from the decoding circuit; a memory; and control means adapted to request, when a key operation for setting retention using a timer is performed, to designate a selected character program from the plurality of character programs, and to designate the time to carry out the retention using the timer, to retain, when the designated time comes, the character program data designated, in the memory, from the plurality of character program data obtained from the decoding circuit, and to read out, when a calling key operation is performed, the character program data retained in the memory, and to display the character program of the retained data on the display element using the data read out. The receiver is capable of timer presetting with small memory capacity.

3 Claims, 15 Drawing Sheets

FIG. 7A

| 16 BITS | 176 BITS | 14 BITS | 82 BITS |
|---|---|---|---|
| BIC 1 | DATA PACKET 1 | CRC | PARITY |
| BIC 1 | DATA PACKET 2 | CRC | PARITY |
| ------ | ----------------------- | --- | -------- |
| BIC 1 | DATA PACKET 13 | CRC | PARITY |
| BIC 3 | DATA PACKET 14 | CRC | PARITY |
| BIC 3 | DATA PACKET 15 | CRC | PARITY |
| BIC 4 | PARITY PACKET 1 | | PARITY |
| BIC 3 | DATA PACKET 16 | CRC | PARITY |
| BIC 3 | DATA PACKET 17 | CRC | PARITY |
| BIC 4 | PARITY PACKET 2 | | PARITY |
| ------ | ----------------------- | --- | -------- |
| BIC 3 | DATA PACKET 94 | CRC | PARITY |
| BIC 3 | DATA PACKET 95 | CRC | PARITY |
| BIC 4 | PARITY PACKET 41 | | PARITY |
| BIC 2 | DATA PACKET 96 | CRC | PARITY |
| ------ | ----------------------- | --- | -------- |
| BIC 2 | DATA PACKET 108 | CRC | PARITY |
| BIC 3 | DATA PACKET 109 | CRC | PARITY |
| BIC 3 | DATA PACKET 110 | CRC | PARITY |
| BIC 4 | PARITY PACKET 42 | | PARITY |
| ------ | ----------------------- | --- | -------- |
| BIC 3 | DATA PACKET 189 | CRC | PARITY |
| BIC 3 | DATA PACKET 190 | CRC | PARITY |
| BIC 4 | PARITY PACKET 82 | | PARITY |

272 BLOCKS (a) (b)

FIG. 8
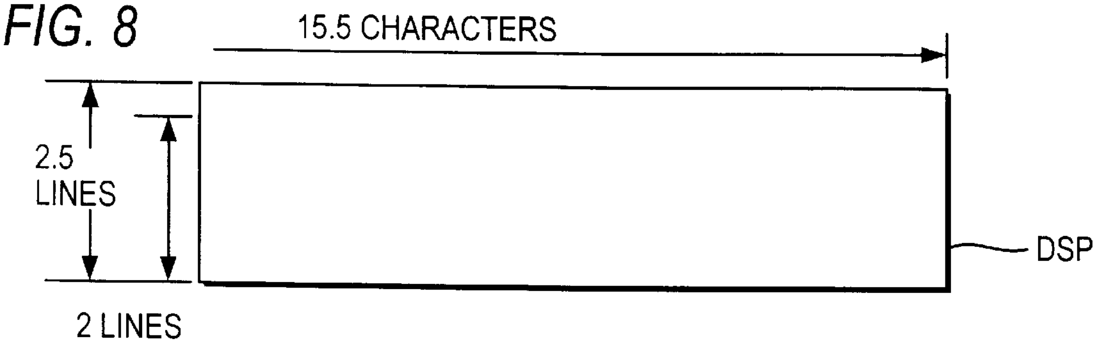
FIG. 9A
FIG. 9B
FIG. 9C
FIG. 9D
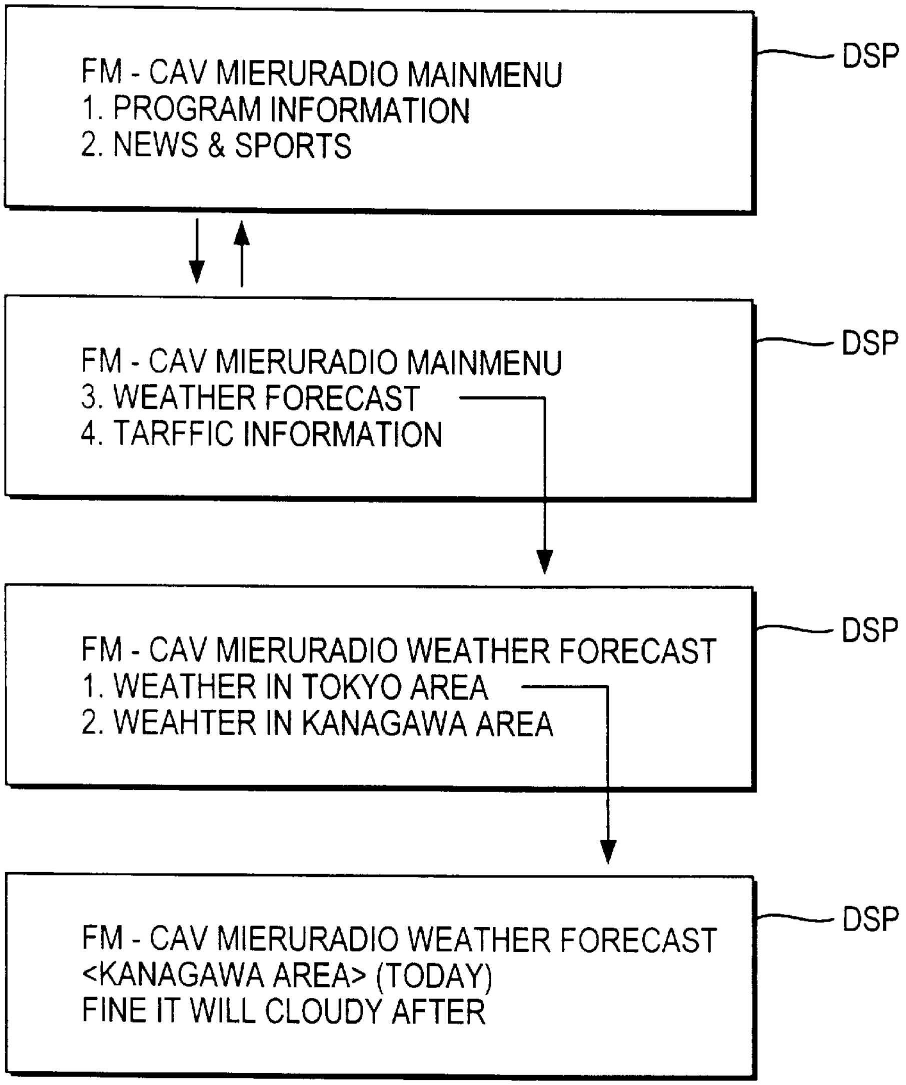

F I G. 10A

FM-CAV MIERURADIO MAINMENU
1.PROGRAM INFORMATION
2.NEWS & SPORTS

F I G. 10B

HEXADCIMAL VALUE → 20 00 6C 0C 0E 89 90 50 31 08 31 2E 0F 8A 48 56 41 48
CHARACTER → 1 . PROGRAM

HEXADCIMAL VALUE → 3E 70 4A 73 0E 89 20 32 08 32 2E 1D 61 0E 4B 65 79 39
CHARACTER → INFORMATION 2 NEWS

HEXADCIMAL VALUE → 1D 60 0E 26 1D 61 0E 39 5D 79 44 1D 60 0E 20 33 08 33
CHARACTER → & SPORTS 3

HEXADCIMAL VALUE → 2E 0F 8A 45 37 35 24 0D 0E 89 34 08 34 2E 0F 8A 38 72
CHARACTER → WEATHER 4 TRA

HEXADCIMAL VALUE → 44 4C
CHARACTER → FFIC

RECEIVER FOR RECEIVING TEXT-BASED MULTIPLEX BROADCASTS AND STORING TEXT-BASED DATA

BACKGROUND OF THE INVENTION

1. Technical Field of the Invention

The present invention relates to a receiver for receiving text-based multiplex broadcasts.

2. Description of Related Art

For example, in Japan, FM broadcasts called "FM text-based multiplex broadcast" are realized in which character information data or the like are multiplexed and transmitted together with the original audio broadcast program.

Such FM text-based multiplex broadcast in Japan is called a DARC (Data Radio Channel) method, which was developed with NHK Broadcasting Technology Research Institute as leader. The multiplexing standard for digital data such as character information is as follows:

Subcarrier frequency: 76 kHz

Transmission rate: 16 kilobits/sec.

Modulation method: LMSK (Level Controlled Minimum Shift Keying)

Error correction method: (272, 190) product code using compacted difference set cyclic code The LMSK signal is frequency multiplexed together with the audio signal (monaural signal or stereo composite signal) in the original audio broadcast program, and the frequency multiplex signal is transmitted.

Program services such as character information can be classified into levels 1, 2 and 3. In all three cases, character information or the like is displayed using a dot display. In level 1, the information is provided as character information in a service for a FM receiver capable of displaying 15.5 characters×2.5 lines including a header.

In level 2, the information is provided as characters and figures in a service for a FM receiver capable of displaying 15.5 characters×8.5 lines including a header. Level 3 is for traffic information services provided for FM receivers capable of displaying detailed maps using CD-ROM or the like, namely, navigation systems.

Level 1 program services can be utilized for news, weather forecasts, traffic information, entertainment, main supplementary programs and the like. In this case, the entertainment would include services providing fortune-telling, messages from listeners, quizzes, town information and the like.

The main supplementary program provides information for supplementing the original audio broadcast program such as the title of the musical composition, the performer's name, telephone and fax numbers for requests when the original audio broadcast program is, for example, a music program. In this respect, the main supplementary program will be hereinafter referred to as "program information" or "program linkage".

In addition to the above program service, "emergency information" may also be provided as required at the time of emergencies.

Data Structure

FIG. 7A shows the frame structure of a data signal which is multiplexed in the FM text-based multiplex broadcast of the DARC method. One frame of this data signal is composed of 272 blocks with each block comprising 288 bits.

One frame comprising 272 blocks is divided into 190 data packet blocks, and 82 vertical parity packet blocks, with the 82 vertical parity packet blocks being distributed and transmitted in the frame.

A 16-bit BIC (Block Identity Code) is added to the head of each block. Four kinds of BIC are used for distinguishing each of the parity packets, and thus the heads of the frame can be discerned.

The data packet block has a 176-bit data packet following the BIC, after which a 14-bit CRC (Cyclic Redundancy Check) code is added, followed by an 82-bit horizontal parity check code.

In this case, the CRC code is added for detecting residual errors after error correction using a product code.

The vertical parity packet block is provided to have a 272-bit vertical parity packet following the BIC.

The data packet consists of a 32-bit prefix and a 144-bit data block following it as shown in FIG. 7B.

The prefix consists of a service identity code, a decode identity flag, an information end flag, an updating flag, a data group number, a page number, a data link code, and a data packet number as shown in FIG. 7C.

In this case, the service identity code consists of 4 bits, and is for discerning the program contents and the like.

Regarding level 1,

0: Undefined

1: General information for sequential reception processing

2: General information for recording and reception processing

4: Traffic information

In this case, the sequential reception processing is a mode for the FM receiver starting decoding processing for displaying on receipt of the first data packet of the program data or the page data. This sequential reception processing is carried out for a program for which it is required on the transmission side to control timing of displaying on the receiving side or for a program for which the information will not be displayed in time if the decoding processing is started after the last packet of the data group is obtained.

The recording and reception processing is a mode for not starting the decoding processing for displaying until all of the data for the program data or the page data are received and error correction is carried out using CRC code for every data group. Therefore, it is possible in the character program in the recording and reception processing to control the timing of displaying on the FM receiver side.

In the prefix, the decode identity flag is "1" when the error correction circuit for the FM receiver outputs data by decoding in the horizontal direction only, and "0" when the data are outputted after decoding in the horizontal direction and the vertical direction.

The sequential reception processing, when the decode identity flag is "0", is defined in such a manner that decoding processing for displaying each of the data packets is carried out at the time when the FM receiver receives the BIC at the head of the 302nd packet from the reception of the BIC at the head of respective data packets.

The information end flag is "1" when transmission of a data group with a certain data group number is completed, and "0" when this is not the case. The updating flag is incremented by one every time a data group is updated.

The data group number is formed of a program number and a page number. The program number is 8 bits, and is from 0 to 255. It is assigned as follows:

0: Main menu 1 to 253: General character program (such as news and weather forecast)

254: Main supplementary program (program information or information linkage)

255: Emergency information.

Further, the page number is 6 bits and is from 1 to 62, i.e., one program can have a maximum of 62 pages. One page corresponds to one data group, with one data group comprising one or a plurality of data blocks.

Furthermore, in the prefix, when the data is so large that the number of data packets belonging to one data group exceeds the maximum value of the data packet number, the data group is divided into a maximum of 4 data groups. When the data group is then transmitted with the same data group number having different data link codes, the data link code is used for linking each of the data groups in the order of 0→1→2→3. The data packet number is allocated in sequence from "0".

The foregoing expresses a data format using the DARC method. Since the data transfer rate and the frame size are as described above, the time required for broadcasting or transmitting data for one frame is a little less than five seconds (=288 bits×272 blocks/16 kilobits).

Example of Display of Character Program

The FM receiver corresponding to level 1 is provided with a display element DSP such as an LCD as shown in FIG. 8, having a display area capable of displaying 15.5 characters× 2.5 lines (248 dots in width by 40 dots in length). In the display area, the 0.5 line area in the upper portion thereof is for displaying the header, and the 2 lines area in the lower portion is for displaying the text.

When the FM receiver receives the text-based multiplex broadcast, the first page of a main menu is displayed on the display element DSP as shown in FIG. 9A. When a predetermined key operation is performed while the first page is displayed in such a way, the next page of the main menu is displayed on the display element DSP as shown in FIG. 9B, and thereafter, the other pages of the main menu will be similarly displayed.

In the main menu, the programs are hierarchically prepared, and when the user selects and decides, for example, "3. WEATHER FORECAST" from the main menu of FIG. 9B, the menu of the program one hierarchy lower, "1. WEATHER IN TOKYO AREA" and "2. WEATHER IN KANAGAWA AREA" are displayed as shown in FIG. 9C.

If the user intends to go to, for example, Kanagawa in the morning and wishes to know the weather in Kanagawa, the user selects and "2. WEATHER IN KANAGAWA AREA". Then, "WEATHER IN <KANAGAWA AREA> (TODAY)" on the first page of the program in a further lower hierarchy is displayed as shown in FIG. 9D. When a predetermined key operation is performed in such a state, "<KANAGAWA AREA> (TODAY) RAIN PROBABILITY" on the second page is displayed as shown in FIG. 9E.

When the predetermined key is further depressed one after another when required, "<KANAGAWA AREA> (TOMORROW) FINE" on the third page is displayed as shown in FIG. 9F, and "<KANAGAWA AREA> (TOMORROW) RAIN PROBABILITY" on the fourth page is displayed as shown in FIG. 9G.

Since the programs are hierarchically prepared in the main menu, the desired character program can be displayed by tracing them in order.

In such a receiver for receiving text-based multiplex broadcasts as described above, "timer presetting" is conceivable in which if the time is preset, the character program data will be automatically received and retained when the time comes, in the same manner as VTR timer picture recording for households. If a 1-megabit memory is used, data for about 500 pages can be retained in the case of one page being two lines (level 1).

Some broadcasting station broadcasting a character program of 200 pages to 400 pages by one character broadcasting.

Therefore, if a 1-megabit memory is used as both timer presetting and a reception buffer for character programs, only an area for 200 pages will be left as the area for the reception buffer for character broadcasting when an area for 300 pages is used for timer presetting. Thus, the area for the reception buffer becomes full soon, and it may become impossible quickly to retain the character program data.

It goes without saying that such a problem will not arise if a memory exclusively used for timer presetting is prepared, but in the case, the cost will be increased.

SUMMARY OF THE INVENTION

It is an object of the present invention to make it possible to retain timer presetting with small memory capacity.

To this end, according to the present invention, there is provided a receiver for receiving text-based multiplex broadcasts for multiplexing a plurality of character program data together with the original audio broadcast program signal to broadcast this multiplex signal, comprising: a receiving circuit for receiving the text-based multiplex broadcast; a decoding circuit for taking out the plurality of character program data from a multiplex signal received by the receiving circuit; a display element for displaying the character program in accordance with data obtained from this decoding circuit; and a memory, wherein when a key operation for setting retention using a timer is performed, it is requested to designate an optional character program of the plurality of character programs, and to designate the time to carry out the retention using the timer; when the designated time comes, the character program data designated, of the plurality of character program data obtained from the decoding circuit is retained in the memory; when a calling key operation is performed, the character program data retained in the memory is read out; and the character program of the data retained is displayed on the display element using the data thus read out. Therefore, when the designated time comes, the character program data of the program name designated is retained in the memory. The character program whose data has been retained is displayed on the display element by a predetermined key operation.

BRIEF DESCRIPTION OF THE DRAWINGS

FIGS. 7A to 7C are explanatory views illustrating the signal format;

FIG. 8 is an explanatory view illustrating the display screen;

FIGS. 9A to 9G are explanatory views illustrating the display screen;

FIGS. 10A and 10B are explanatory views illustrating the content of the signal.

DETAILED DESCRIPTION OF PREFERRED EMBODIMENT

Figure 9E:
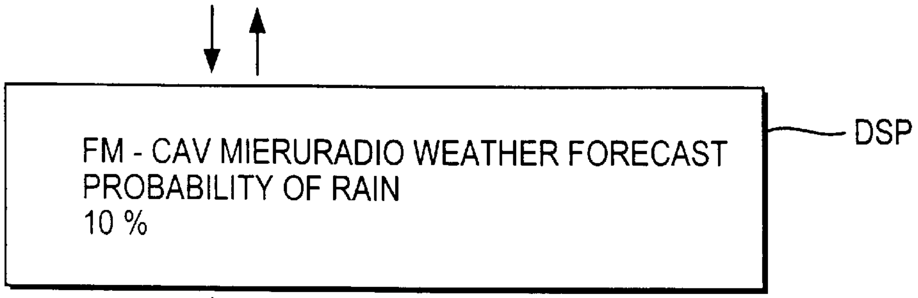
Figure 9F:
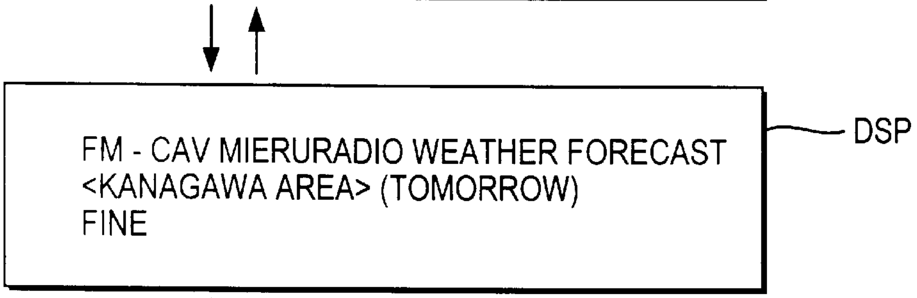
Figure 9G:
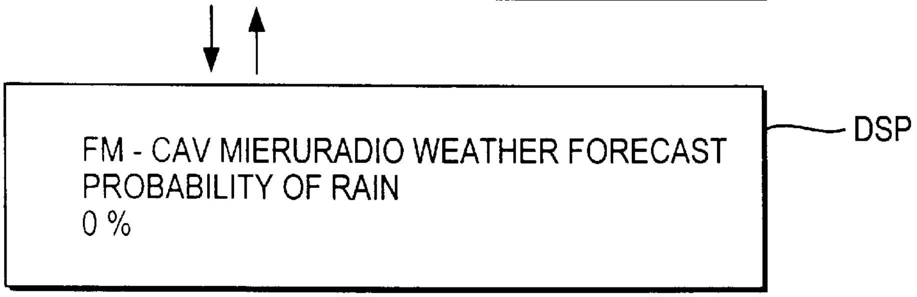
Figure 11A:
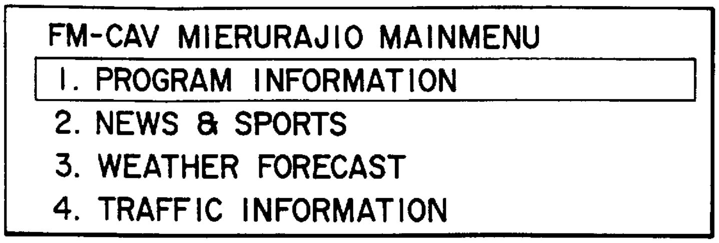
FIGS. 11A to 11I show the English version of the typical display on LCD50 shown in FIGS. 5A to 5G and 6A to 6I.
Figure 11B:
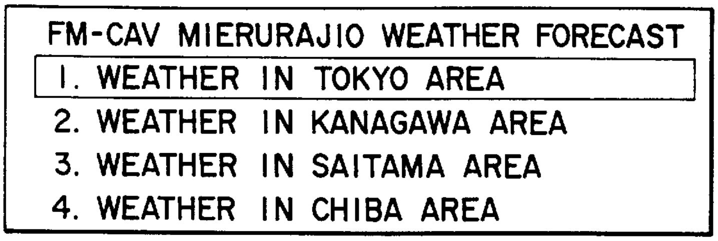
Figure 11C:
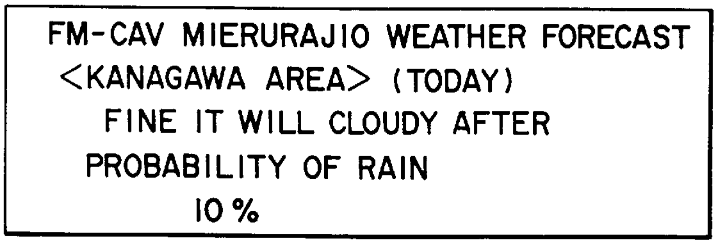
Figure 11D:
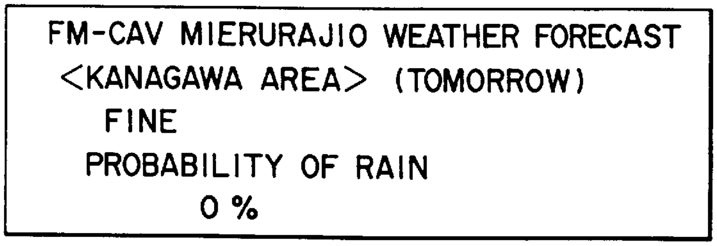
Figure 11E:
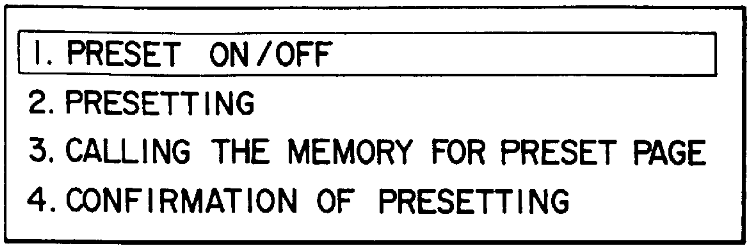
Figure 11F:
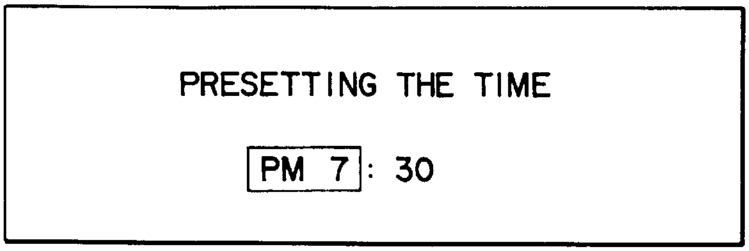
Figure 11G:
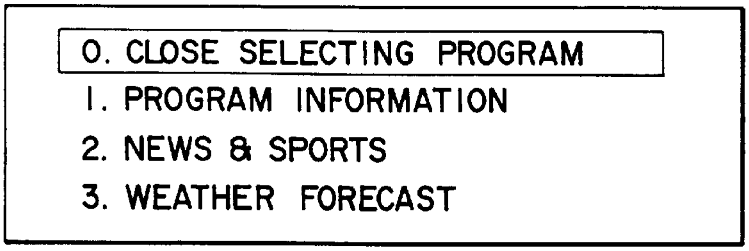
Figure 11H:
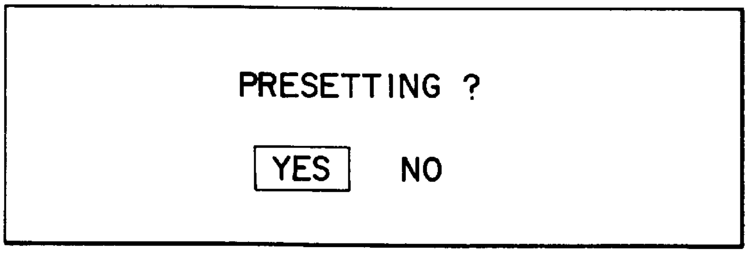
Figure 11I:
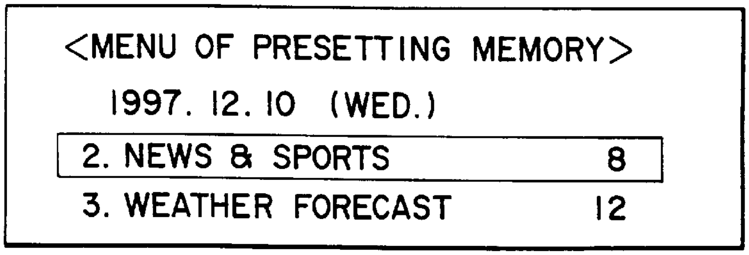

As described above, all the character programs are hierarchically prepared, and for example, "<KANAGAWA AREA> (TODAY) WEATHER" shown in FIG. 9D belongs to item "3. WEATHER FORECAST" in the main menu shown in FIGS. 9A and 9B.

The program information and emergency broadcast can be also considered to be at the root of the hierarchy. The respective character programs are provided with program numbers.

On the other hand, FIG. 10A shows a display example for the main menu in the text-based multiplex broadcast, and the data received to display this main menu is as shown in FIG. 10B. In other words, in FIG. 10B, the upper section of each line shows the data received in hexadecimal value, and the lower section thereof is obtained by inscribing the character code of the data in the upper section in character.

As can be seen from this figure, the data for the main menu is composed of character codes of characters displayed on the main menu and various control codes.

The present invention aims at the above-described points and retains the character program data in units of programs in the main menu while retaining timer presetting.

Structure

Figure 1:
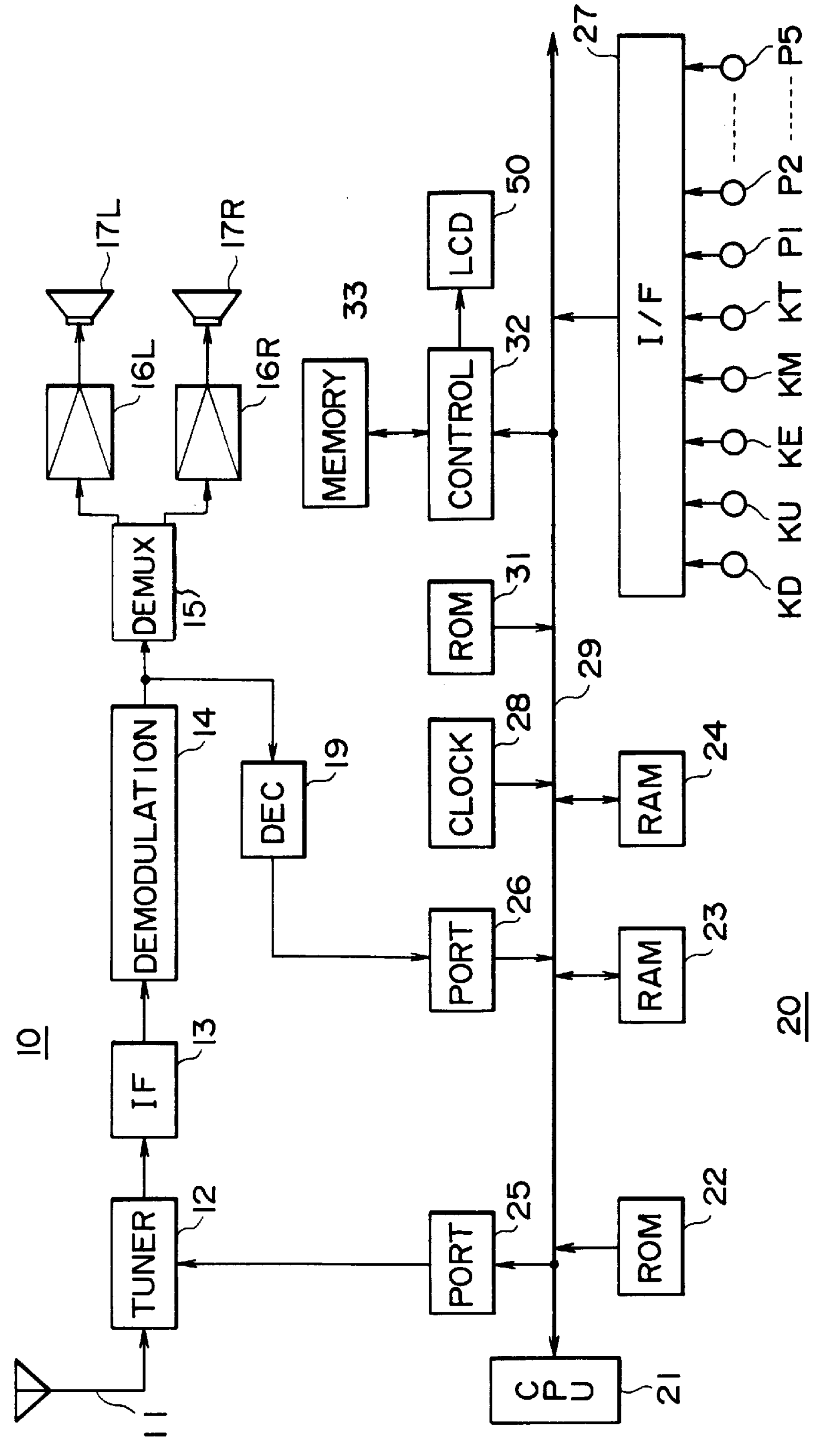
FIG. 1 is a system diagram showing a configuration of the present invention.

FIG. 1 shows a case where the present invention applies to a FM receiver having the level 1 receiving capacity. In this FM receiver, a maximum of seven broadcasting stations can be preset. A reference numeral 10 designates the FM receiving circuit, in which a FM signal received by an antenna 11 is provided to a tuner circuit 12 of a synthesizer method, whereby a broadcasting station of the desired frequency is selected and the FM signal is converted into an intermediate frequency signal. The intermediate frequency signal is provided to a FM demodulation circuit 14 via an intermediate frequency circuit 13 having an intermediate frequency filter and a wide band amplifier.

Then, taken out from the demodulation circuit 14 is a frequency multiplexed signal of a sum signal (L+R) of the left and right channels of stereo audio signals L and R; a DSB signal which is balance-modulated with a difference signal (L−R) thereof; a pilot signal; and the LMSK signal in the above-described FM text-based multiplex broadcast.

This frequency multiplexed signal is then provided to a stereo demultiplexing circuit 15 where audio signals L and R are demodulated from the sum signal (L+R) and the DSB signal. These audio signals L and R are then provided to left and right channel speakers 17L and 17R via amplifiers 16L and 16R respectively.

Further, this FM receiver is provided with a microcomputer 20 as control means for selecting a station in the tuner circuit 12 and for displaying characters transmitted through a FM text-based multiplex broadcast. A 4-bit microcomputer PD17073 manufactured by NEC Corporation was used as this microcomputer 20. This microcomputer 20 comprises a CPU 21 for executing programs, a ROM 22 used for storing the programs, a RAM 23 for storing a data area, and a RAM 24 for storing a work area. Further, these memories 22 to 24 are connected to the CPU 21 through a system bus 29.

Figure 2:
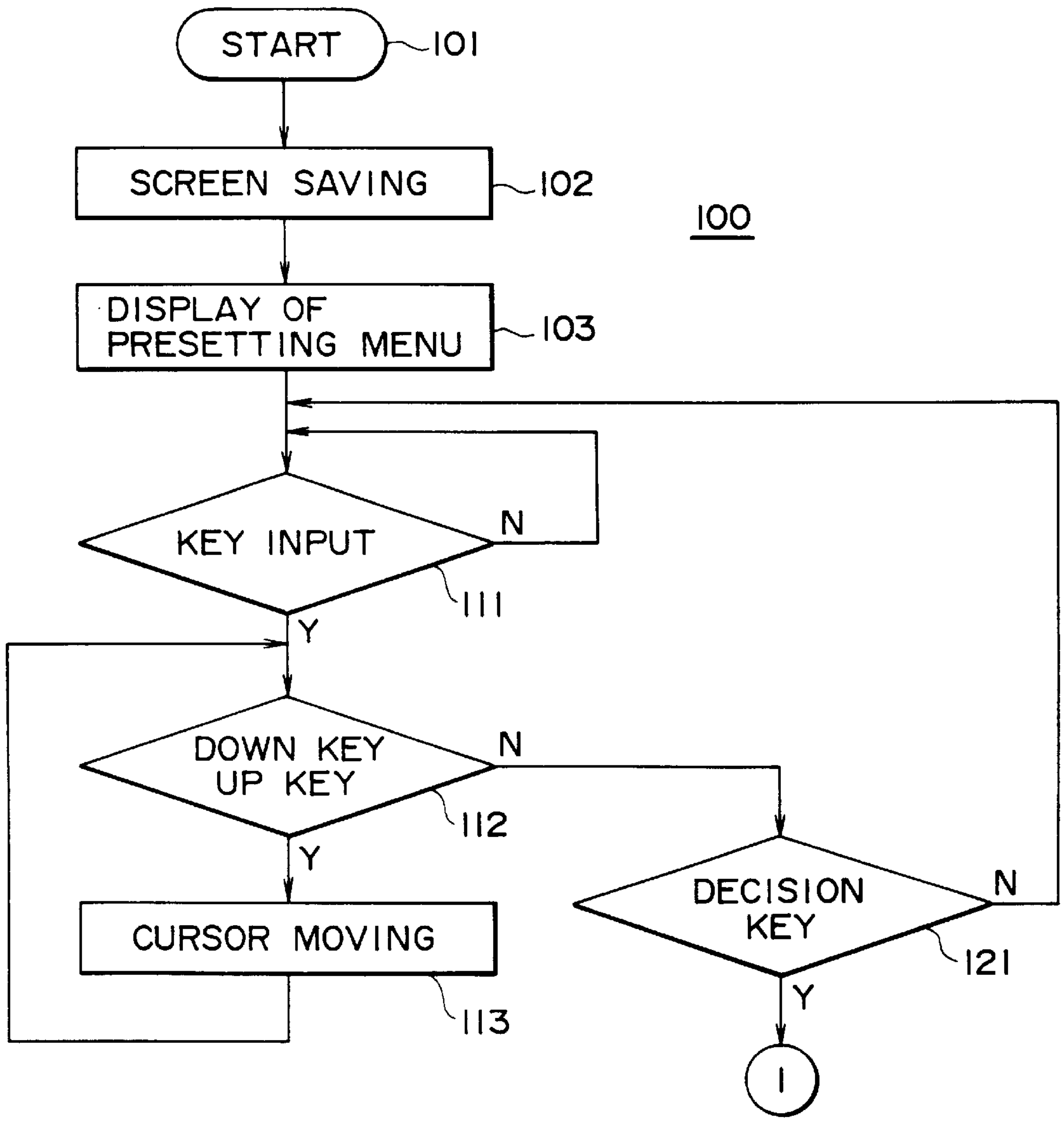
FIG. 2 is a flow chart showing a configuration of the present invention.
Figure 3:
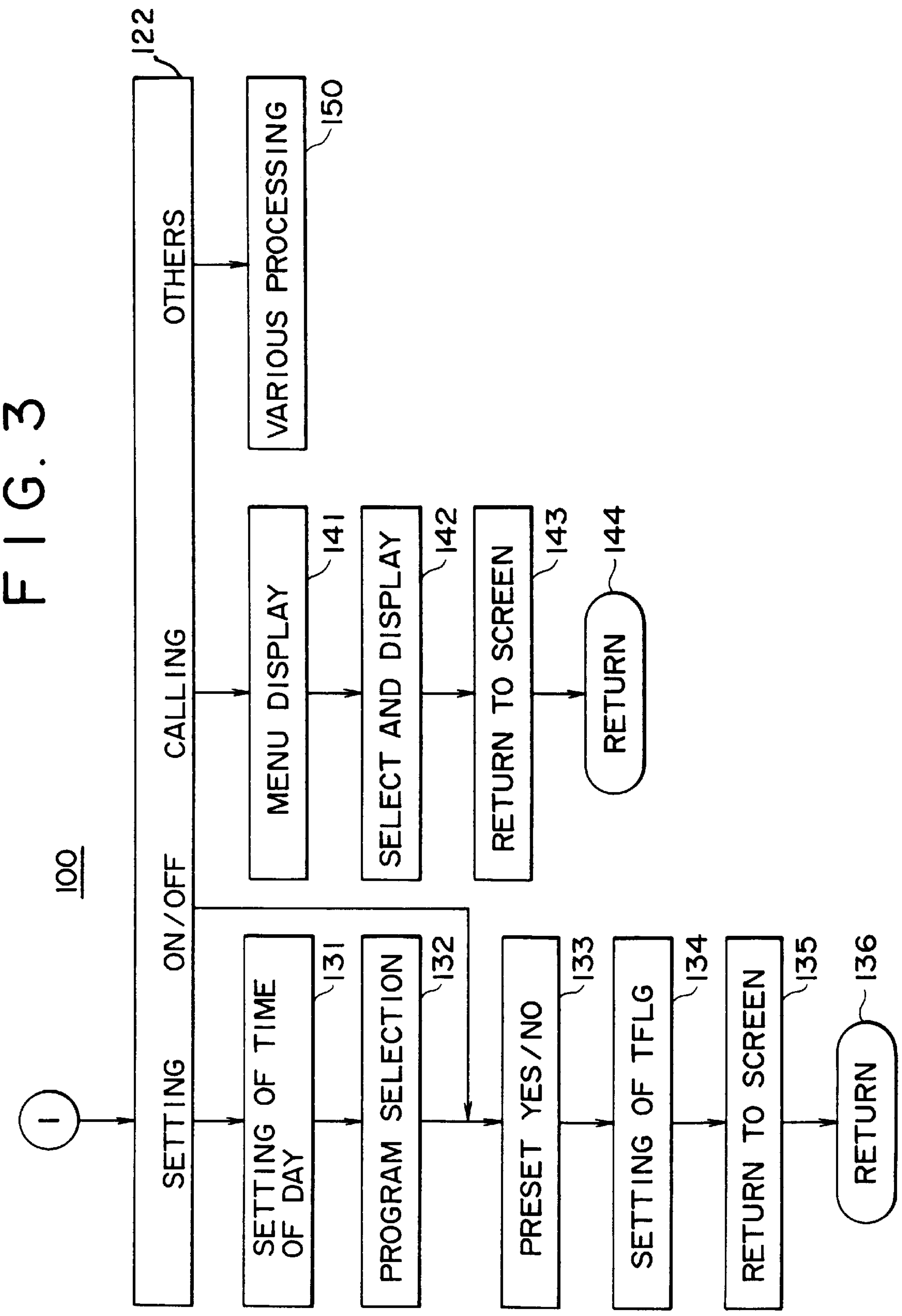
FIG. 3 is a flow chart showing a configuration continuing from FIG. 2.
Figure 4:
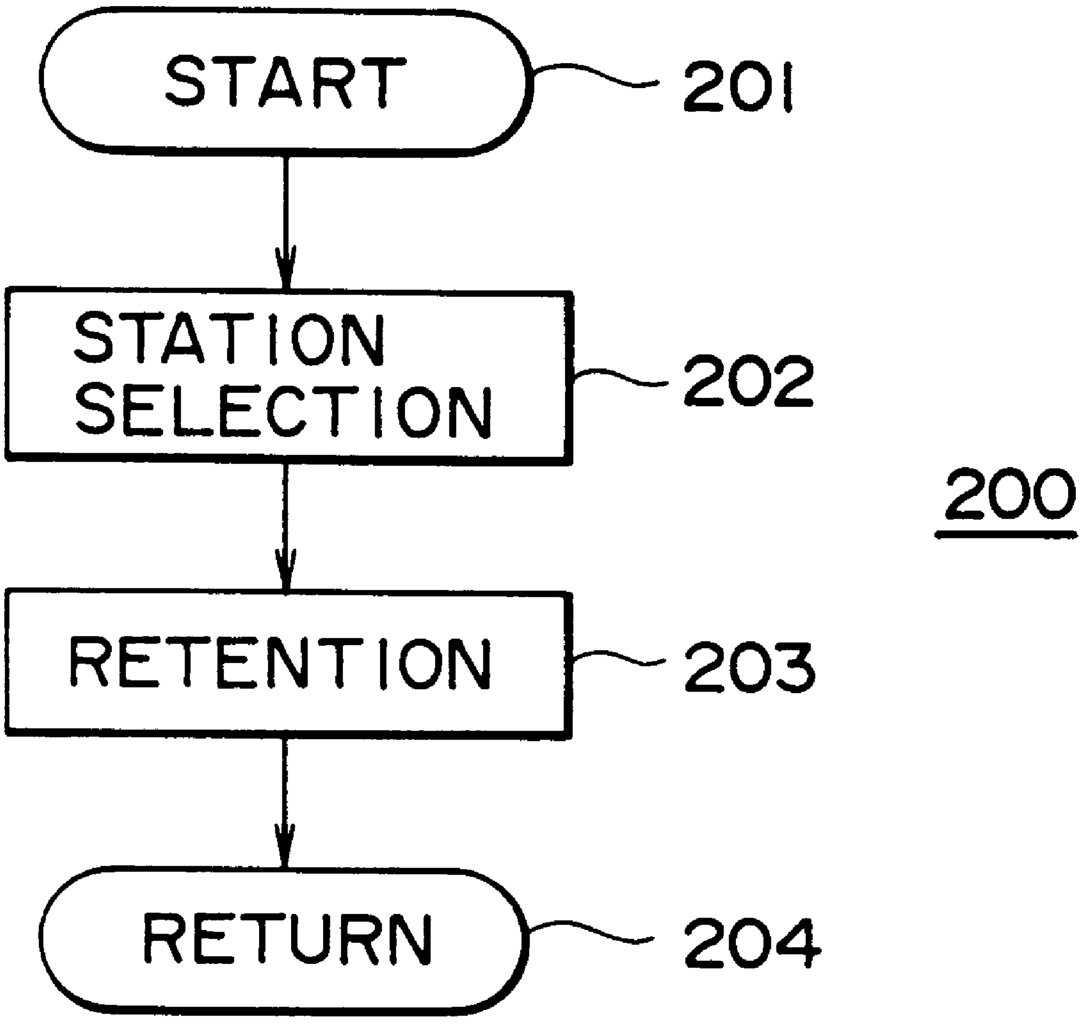
FIG. 4 is a flow chart showing a configuration of the present invention.

In this case, prepared in the ROM 22 are various routines, as well as a timer presetting routine 100 shown in, for example, FIGS. 2 and 3 and a timer retention routine 200 shown in FIG. 4. These routines 100 and 200 will be described in detail later. The timer presetting routine 100 is for setting the time, character programs and the like on retaining character programs by means of timer presetting, and the timer retention routine 200 is for retaining character programs by means of timer presetting.

A RAM 24 has, for example, 1 megabits, i.e., memory capacity capable of retaining data for about 500 pages in the case of one page being two lines (level 1). The RAM 24 is used as both a reception buffer for FM text-based multiplex broadcast data and a save area for character program data during timer presetting.

Furthermore, ports 25 and 26, an interface circuit 27 and a clock circuit 28 are connected to the bus 29. Data for selecting a station are provided to the tuner circuit 12 from the CPU 21 via the port 25, and station selection is made. A demodulation signal from the demodulation circuit 14 is provided to a decoding circuit 19 whereby the character program data are decoded, error corrected and taken out from the LMSK signal. These data are accumulated in the RAM 24 used for the reception buffer through the port 26.

Connected to the interface circuit 27, are, as operation keys, a down key KD, an up key KU, a decision key KE, a menu key KM, a presetting key KT, and for example, seven station selection keys P1 to P7. In this respect, these keys KD, KU, KE, KM, KT and P1 to P7 are made up of non-lock type push switches. The clock circuit 28 is for counting the present time.

Further, connected to the bus 29 is a font ROM (character generator) 31 having font data for converting character data received through a FM text-based multiplex broadcast into display data, as well as a display controller 32. A memory 33 for display use is connected to the controller 32 with, for example, a LCD50 being connected thereto as a display element.

Figures 5A, 5B, 5C, 5D:
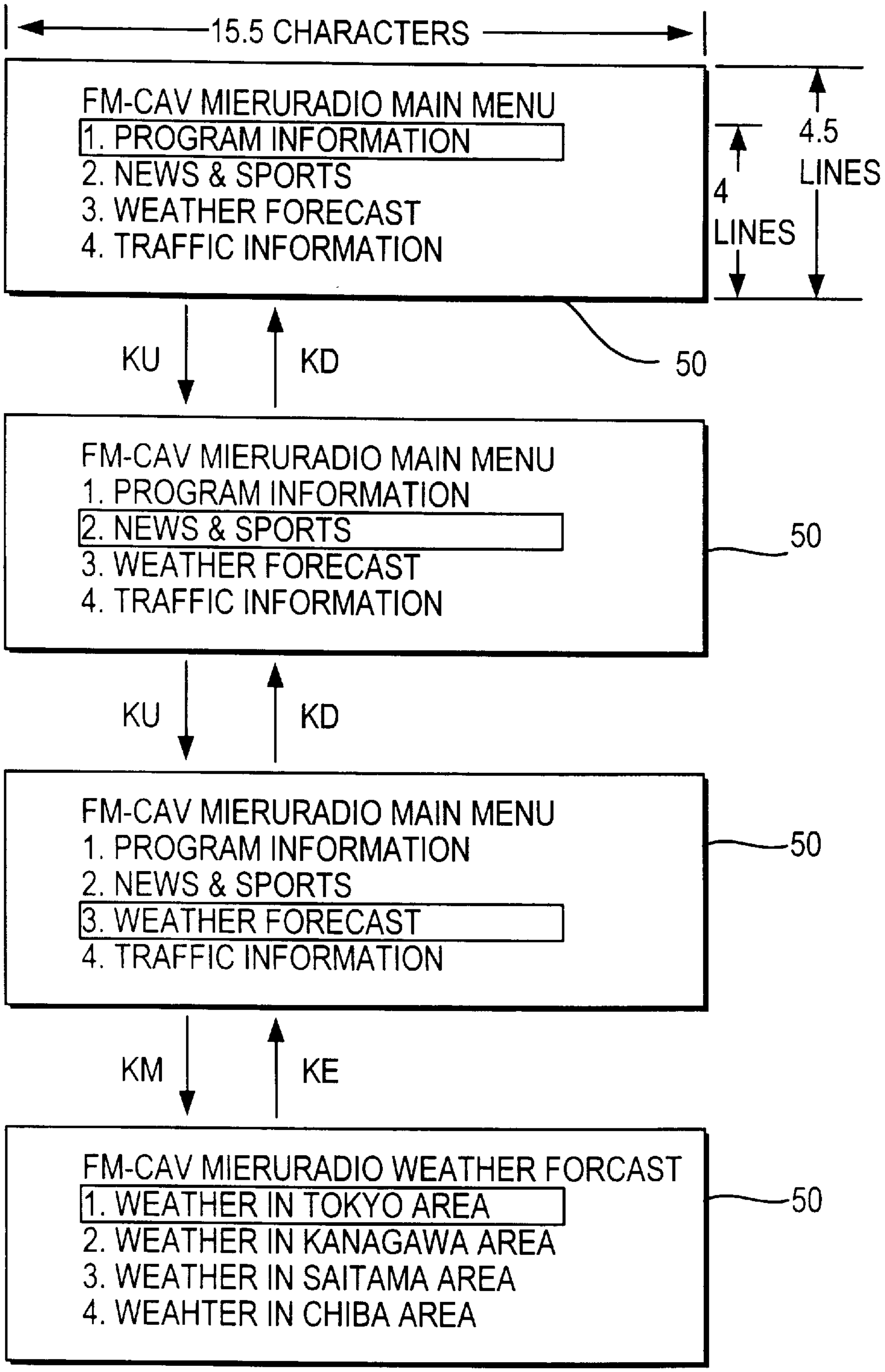
FIGS. 5A to 5G are explanatory views illustrating the present invention.

In this case, the LCD50 displays various characters or the like by a combination of dots, and its display area has, as shown in, for example, FIG. 5A, a size equal to two pages of character program of level 1, that is, 15.5 characters×4.5 lines (248 dots in width×72 dots in length). In the display area, the 0.5 line (8 dots in length) area in the top portion displays a header area, and the remaining 15.5 lines×4 lines (64 dots in length) area displays the main area for the text.

Furthermore, the memory 33 adopts a bit map method corresponding to the dot display method of the LCD50 and has a capacity for one screen of the LCD50. Then, data retained in the RAM 24 for a reception buffer, or data prepared in the ROM 22 in advance are read out by the CPU 21, the read-out data are converted into display data using the font data of the ROM31, and these display data are written in the memory 33 through the controller 32.

At this time, the display data of the memory 33 are repeatedly read out by the controller 32 and are converted into display signals and provided to the LCD50. Therefore, characters based on the character data read out from the RAM 24 by the CPU21, or characters based on the character data prepared in the ROM22 are displayed on the LCD50.

With such a construction, various processing such as displaying are executed by the CPU21 as follows.

Preset Station Selection

This is a case where broadcasting stations preset to station selection keys P1 to P7 are selected. In this case, a station selection key Pm (m=any of 1 to 7. The same applies hereinafter) preset to the desired broadcasting station is depressed, of the station selection keys P1 to P7.

Then, the frequency data Nm is read out from an address Am, corresponding to the key Pm thus depressed, of addresses A1 to A7 of the RAM23, the frequency data Nm read out is provided to the tuner circuit 12 via the port 25, and the receiving frequency of the tuner circuit 12 is set to a frequency indicated by the frequency data Nm. In this respect, a local oscillation circuit (not shown) within the tuner circuit 12 is composed of a PLL synthesizer.

Accordingly, the broadcasting station which is preset to the station selection key Pm can be selected by a single touch.

A method of writing frequency data in addresses A1 to A7 is the same as in a general receiver of the synthesizer method.

Display of Character Program

This is a case where the desired character program is displayed. The description will be made by exemplifying a case of displaying "WEATHER IN KANAGAWA AREA".

In this case, a broadcasting station which is broadcasting the desired character program is selected by "preset station selection". Then, the character program data is decoded, error corrected and taken out from the decoding circuit 19, and this data is accumulated in the RAM24 used for reception buffer via the port 26.

When the data is accumulated to a certain degree, or when the menu key KM is depressed, the first and second pages of the main menu are displayed on the LCD50 as shown in, for example, FIG. 5A in accordance with the character data in the RAM24. At this time, "1. PROGRAM INFORMATION" on the first line is displayed so that it is, for example, enclosed with a quadrilateral frame, which means a cursor is used.

When the down key KD is depressed, the cursor display position changes through the states of FIG. 5A→FIG. 5B→FIG. 5C→ . . . , and further the display of the main menu is scrolled whenever the key is depressed. In this respect, when the up key KU is depressed, the cursor display position changes in the opposite direction to the case where the down key KD is depressed.

Since the display of weather forecast is desired in this case, when the cursor is positioned at "3. WEATHER FORECAST" as shown in, for example, FIG. 5C, the decision key KE is depressed. Then, as shown in, for example, FIG. 5D, the first and second pages of the "3. WEATHER FORECAST" menu are displayed with the cursor being displayed on the first line.

Figure 5E:
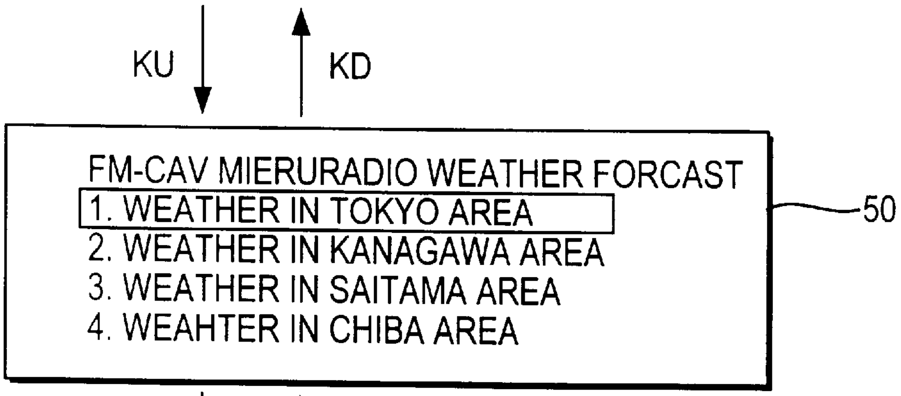

When the down key KD is further depressed, the cursor is displayed at "WEATHER IN KANAGAWA AREA" on the second line as shown in, for example, FIG. 5E, and the decision key KE is depressed. Then, the first and second pages of "<KANAGAWA AREA> (TODAY) WEATHER" are displayed as shown in, for example, FIG. 5F. When the down key KD is further depressed if necessary, "<KANAGAWA AREA> (TOMORROW) WEATHER" on the third and fourth pages is displayed as shown in FIG. 5G. In this respect, no cursor is displayed at this time.

Figure 5F:
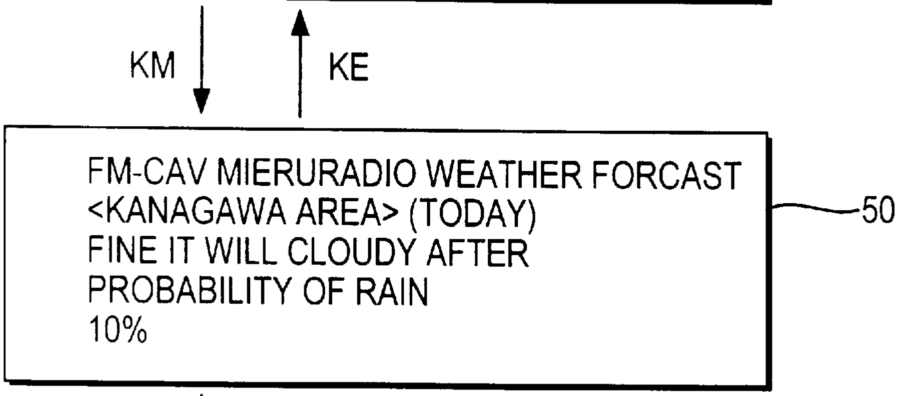
Figure 5G:
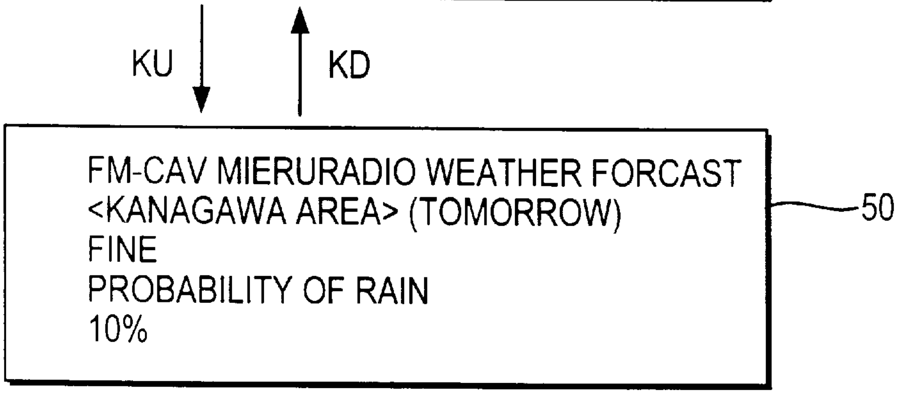

Since these FIGS. 5F and 5G display the desired character information, the key operation for displaying is terminated. In this respect, if, for example, the "WEATHER IN KANAGAWA AREA" has the fifth page and after, the fifth page and after can be displayed by depressing the down key KD. Depressing the up key KU displays the previous pages. Further, when any menu or any page is displayed, depressing the menu key KM returns the display to a menu with one hierarchy higher.

In order to display the character program as described above, the down key KD, the up key KU and the decision key KE can be operated.

Timer Presetting

In order to retain an optional character program by timer presetting, a case of setting the conditions is described. In this case, a broadcasting station, which is broadcasting a character program which is desired to be timer preset, is selected by "preset station selection", and thereafter, the presetting key KT is depressed.

Then, processing by the CPU21 is started from a step 101 of the timer presetting routine 100 as shown in FIG. 2, and in a next step 102, the data of the display content of the LCD50 is saved in the RAM23. Thereafter, in a step 103, a presetting menu for timer presetting is displayed on the LCD50 as shown in, for example, FIG. 6A. At this time, the cursor is displayed on an item "1. PRESET ON/OFF" on the first line as shown in FIG. 6A.

Subsequently, processing advances to a step 111 to wait for key input. When the key input is provided, it is discriminated in a step 112 whether or not the key inputted in the step 111 is the down key KD or the up key KU, and if it is found not to be the key KD or KU, processing advances from the step 112 to a step 121. In this step 121, it is discriminated whether or not the key inputted in the step 111 is the decision key KE, and if it is found not to be the decision key KE, processing returns from the step 121 to the step 111.

When the down key KD or the up key KU is depressed while key input is being waited in the step 111, processing advances from the step 112 to a step 113. In this step 113, the display position of the cursor is changed in the presetting menu screen shown in FIG. 6A. More specifically, if the key inputted in the step 111 is the down key KD, the cursor moves to the following line as shown in, for example, FIG. 6B. If the key inputted in the step 111 is the up key KU, the cursor display position is changed so as to return the cursor to the previous line, and thereafter processing returns to the step 111. If the cursor is positioned on the fifth line and after in the presetting menu although not shown, the display screen is scrolled.

Figure 6A:
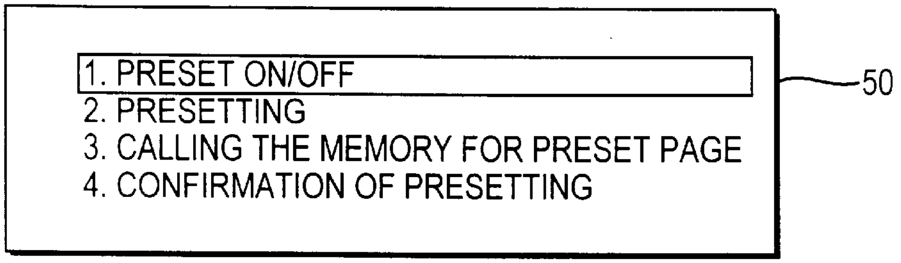
FIGS. 6A to 6I are explanatory views illustrating the present invention.

Therefore, according to the steps 111 to 113, it is possible to position the cursor in FIG. 6A to any line (item) by depressing the key KD or KU.

Figure 6B:
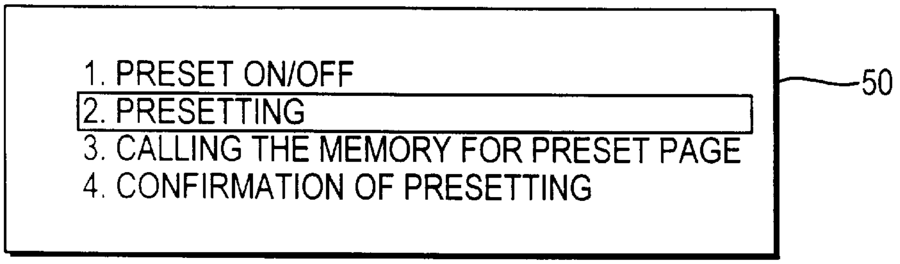

In this case, that is "timer presetting", when the cursor is positioned at the item "2. PRESETTING" on the second line as shown in FIG. 6B, the decision key KE is depressed. Then, processing advances from the step 121 to a step 122, and it is discriminated in this step 122 at which line (item) the cursor was positioned when the decision key KE was inputted in the step 111.

In this case, since the cursor is positioned on the second line as shown in FIG. 6B, processing advances from the step 122 to a step 131, and in this step 131, presetting the time in the timer presetting is performed. More specifically, an input screen for time of day in the timer presetting is first displayed on the LCD50 as shown in, for example, FIG. 6C, and at this time, the cursor is displayed at the position of a numeral indicating "hour" of time of day for the timer presetting, which shows setting of "hour".

When the up key KU is depressed, the numeral indicating "hour" in time of day for timer presetting on the LCD50 is incremented every time the up key is depressed, and when the down key KD is depressed, the numeral indicating "hour" in the time of day for timer presetting is decremented every time the down key is depressed. Thus, when the numeral indicates the desired "hour" in the time of day for timer presetting, the decision key KE is depressed. Then, the cursor display position shifts to the position of a numeral indicating "minute" in time of day for timer presetting, and thereafter, the numeral of "minute" varies by depressing the up key KU and the down key KD in the same manner as in the case of "hour".

When the desired "minute" of time of day for timer presetting appears on the LCD50, the decision key KE is depressed. Then, the time of day for timer presetting is set, and the data indicating the timer time of day is stored in the RAM23. Also, data of the frequency of the broadcasting station which is received at this time is also stored in the RAM23. Thus, in the step 131, the time of day for timer presetting is received and the time of day is stored.

Thereafter, processing advances to a step 132, and in this step 132, the program name of a character program to be timer preset is selected. More specifically, the data on the program name of the character program is extracted from the main menu data, and the data on the program name thus extracted is used to display the main menu for character broadcast on the LCD50 as shown in, for example, FIG. 6D. At this time, a character string of "0. CLOSE SELECTING PROGRAM" is displayed on the first line in addition to the main menu, and the cursor is displayed at the position of this character string.

When the down key KD or the up key KU is depressed, the cursor display position moves or scrolls one line at a time (for each program name) every time the key is depressed in the same manner as in the case of FIGS. 5A to 5C.

Figure 6C:
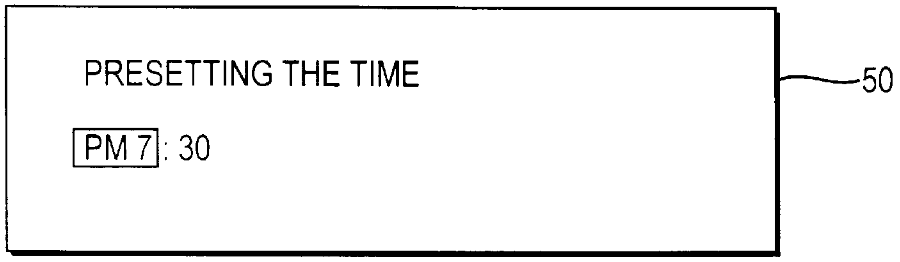
Figure 6D:
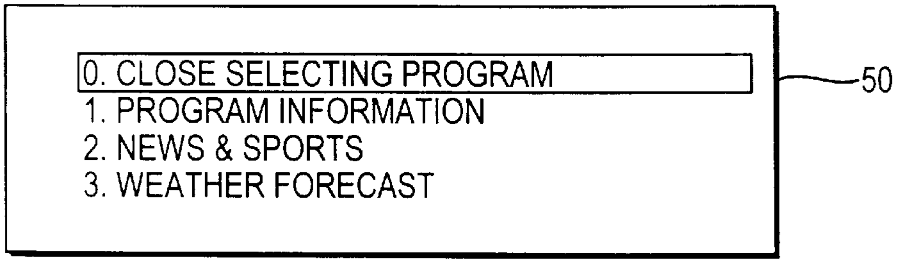
Figure 6E:
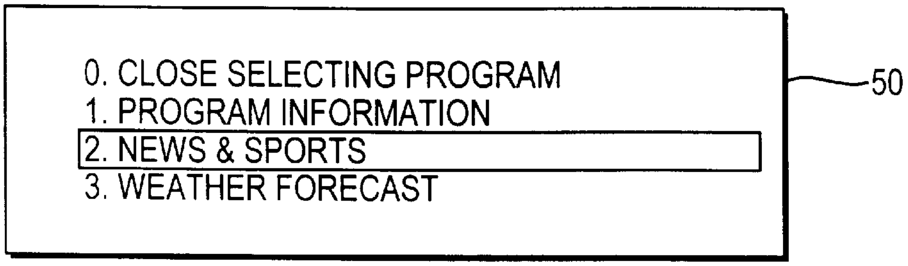
Figure 6F:
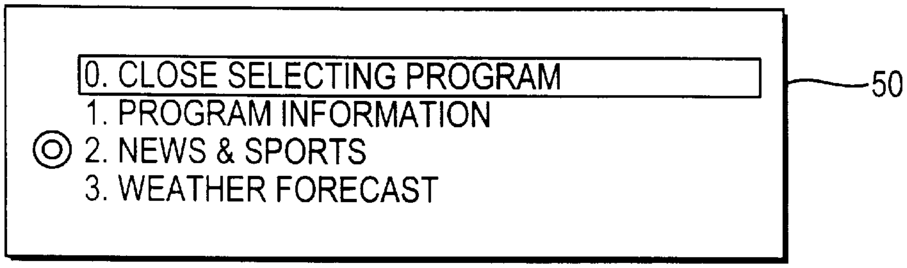

If the decision key KE is depressed when the cursor is displayed at the position of the program name of a character program to be timer preset as shown in, for example, FIG. 6E, the data indicating the character program of the program name at the cursor position, for example, the program number is stored in the RAM 23. Next, the display shown in FIG. 6F is provided on the LCD50. More specifically, a mark "◎" indicating that timer presetting has been made is displayed in front of the program name of character program for which timer presetting has been made. In this case, since "2. NEWS & SPORTS" has been timer preset, the mark "◎" is displayed in front of the "2. NEWS & SPORTS".

Figure 6G:
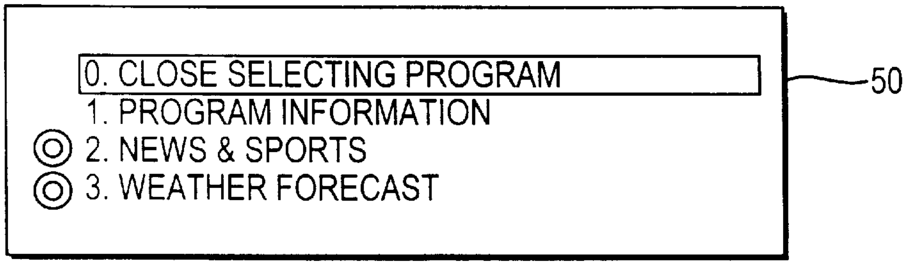

Thereafter, timer presetting can be made for a maximum of six programs, for example, in the same manner. FIG. 6G shows a case where "2. NEWS & SPORTS" and "3. WEATHER FORECAST" have been timer preset. In this respect, if the decision key KE is depressed when the cursor is positioned at the program name of a character program which has been timer preset, the presetting of the character program will be canceled.

When the decision key KE is depressed when the cursor is at the position on the screen shown in FIG. 6G after the completion of timer presetting for a desired character program, processing advances to a step 133. In this step 133, a query screen as to whether or not the present timer presetting is to be made effective is displayed on the LCD50 as shown in, for example, FIG. 6H, and the cursor is displayed at the position "YES". Depressing the down key KD or the up key KU switches the cursor display position from "YES" to "NO", and vice versa.

When "YES" or "NO" is selected by depressing the decision key KE, processing advances to a step 134. In this step 134, when "YES" is selected by depressing the decision key KE, a presetting flag TFLG is set to "1", and when "NO" is selected by depressing the decision key KE, the presetting flag is set to "0". In the case when TFLG="1", the timer presetting under the conditions set in the steps 131 and 132 becomes effective to retain the character program, while when TFLG="0", the timer presetting itself is ignored irrespective of the conditions set, and the character program is not retained.

Next, processing advances to a step 135, where the display on the LCD50 is returned to the content before the timer presetting routine 100 is executed, with the data saved in the step 102, and thereafter, this timer presetting routine 100 is terminated by a step 136.

According to the steps 131 to 134, the conditions for timer presetting, that is, the time of day and character program retained by the timer presetting can be set in this way.

Change of ON/OFF in Timer Presetting

This is a case of setting a timer presetting whose conditions have already been set so as to make the timer presetting itself effective or ineffective. In this case, the presetting key KT is depressed.

As described in (Timer Presetting), the timer presetting routine 100 is executed by the CPU21, and the presetting menu is displayed on the LCD50 as shown in FIG. 6A to enter the wait state for key input in the step 111.

Since the cursor is displayed at an item "1. PRESET ON/OFF" on the first line as shown also in FIG. 6A when this presetting menu has just been displayed, the decision key KE is depressed. Then, processing advances from the step 111 to the step 122 via the steps 112 and 121, and in this case, when the decision key KE was inputted in the step 111, processing advances from the step 122 to the step 133 because the cursor is positioned on the first line as shown in FIG. 6A.

Figure 6H:
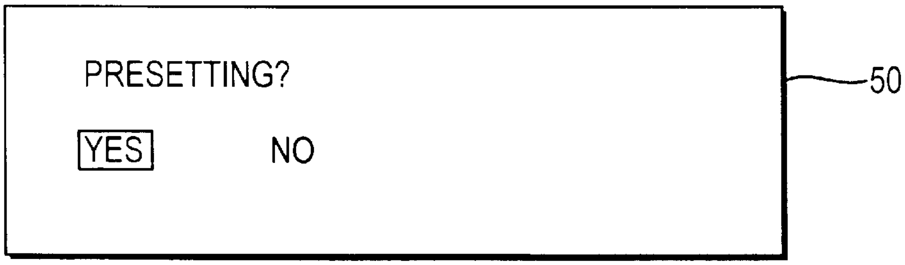

Thereafter, the query screen for timer presetting shown in FIG. 6H is displayed on the LCD50 as described in (Timer Presetting). It is possible to select "YES" or "NO" with the down key KD and the up key KU, and the presetting flag TFLG is set to "1" or "0" by depressing the decision key KE for the selection result.

Accordingly, even if the timer presetting has been made, it can be set so as to ignore it or make it effective.

Retention of Character Program by Timer Presetting

This is a case of retaining a character program in accordance with conditions set by (Timer Presetting). In this case, the timer presetting is set to be effective in advance as TFLG="1" by means of (Timer Presetting) or (Change of ON/OFF in Timer Presetting).

When the time of day counted by a clock circuit 28 coincides with the time of day set in the step 131 of the timer presetting routine 100, the CPU21 starts execution of the timer retention routine 200. More specifically, processing by the CPU21 is started from the step 201 of the routine 200 as shown in FIG. 4 and in a next step 202, frequency data of the broadcasting station stored in the step 131 is read out from the RAM23, and this frequency data is provided to the tuner circuit 12 to select the broadcasting station.

In a next step 203, data indicating the character program stored in the step 132 is read out from the RAM23 to enter the standby state for character program data indicated by this data. On receipt of the character program data, the data is superscribed in an area of the RAM24 used for retaining timer presetting.

Data on the date of the day when the retention has been made is also retained in the RAM24 along with the data of time of day counted by the clock circuit 28. If the character program of data retained is program information at this time, the retention is to be terminated when data for, for example, 50 pages are retained because the program information is not limited in length.

When all character programs set in the step 132 are completed and all the data are retained in the RAM24, this routine 200 is terminated in a step 204.

According to the routine 200, if the timer presetting is made effective in advance as TFLG="1" by means of (Timer Presetting) or (Change of ON/OFF in Timer Presetting), the character program data set in advance is stored in the RAM24 to be retained when the time of day, which has been set by (Timer Presetting), comes.

Calling Retained Program

This is a case of calling a character program retained by (Retention of Character Program by Timer Presetting) for displaying. In this case, a calling key KC is depressed in an optional display state.

As described in (Timer Presetting), the timer presetting routine 100 is executed by the CPU21, and the presetting menu is displayed on the LCD50 as shown in FIG. 6A to enter the wait state for key input in the step 111.

In this case of (Calling Retained Program), the down key KD or the up key KU is depressed to position the cursor at the item "3. CALLING THE MEMORY FOR PRESET PROGRAM" of the presetting menu on the third line, and the decision key KE is depressed. Then, processing advances from the step 121 to the step 122. In this case, the cursor is positioned on the third line of the presetting menu, and therefore, processing advances from the step 122 to a step 141.

Figure 6I:
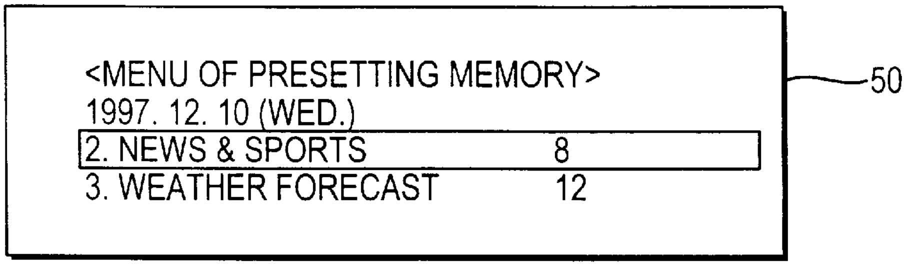
Figures 7B, 7C:
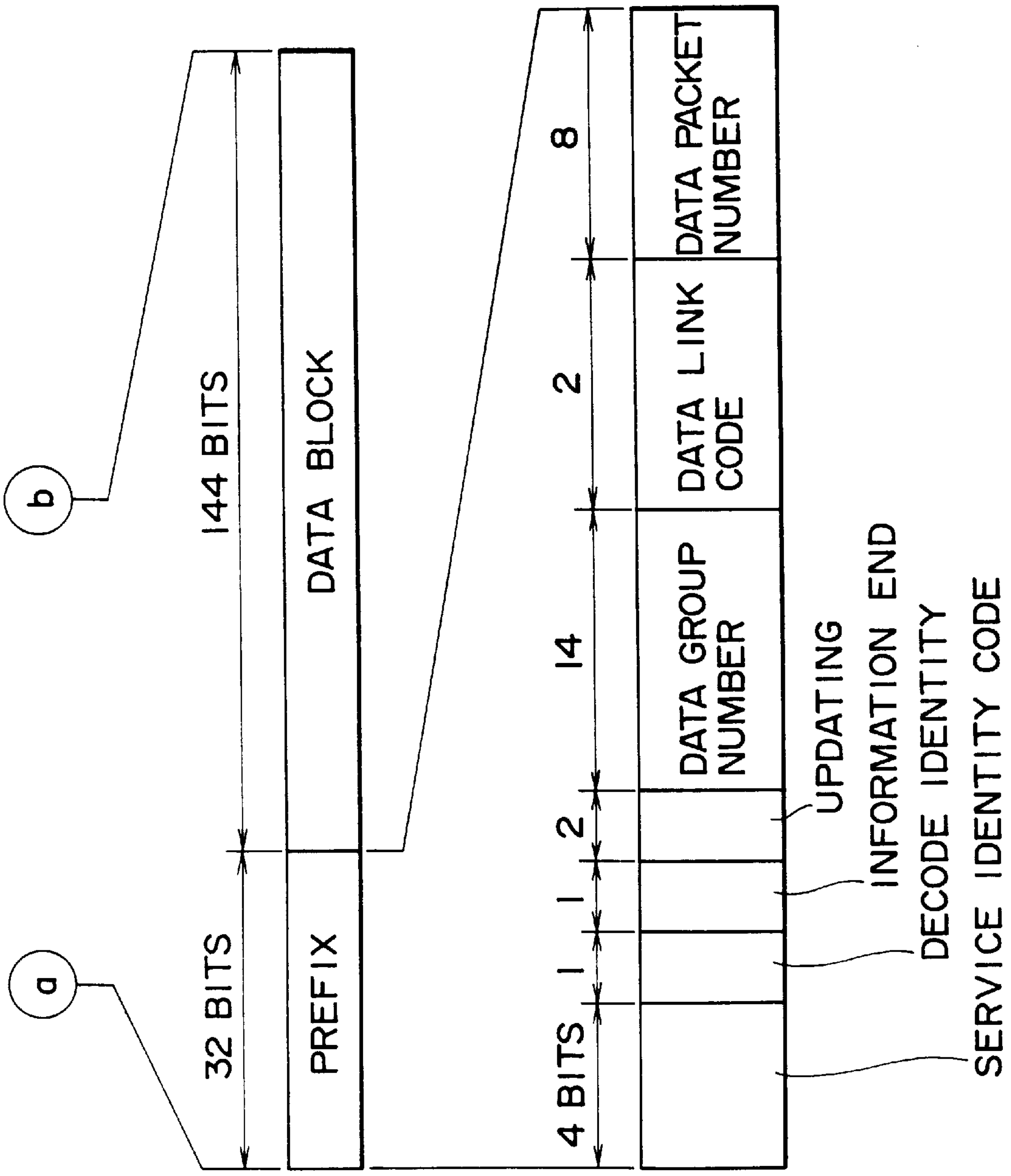

In this step 141, a menu of presetting memory is displayed on the LCD50 as shown in, for example, FIG. 6I. In this case, the menu of presetting memory is composed of a date on which the character program has been retained by timer presetting, and the program name of the character program thus retained by use of the data retained in the RAM24 in the step 204. At the end of the display line of each program name, the number of pages in which the character program has been retained is displayed. Further, the cursor is displayed at the position of the first program name.

Subsequently, processing advances to a step 142, and in this step 142, the character program retained by the timer presetting and its pages are selected and displayed by the same key operation as when the character program is selected in real time and displayed.

More specifically, when the down key KD or the up key KU is depressed in a display state shown in, for example, FIG. 6I, the cursor moves between respective program names, or the program names are scrolled. Then, if the decision key KE is depressed when the cursor is positioned at the desired program name of character program, the menu or page lower than the character program is displayed. By depressing the down key KD, the up key KU or the decision key KE, the character program retained by timer presetting is selected, and further, its page is selected and displayed.

When any menu or any page is displayed, depressing the menu key KM returns the display to a menu one hierarchy higher.

When, for example, the menu key KM is depressed while the menu of presetting memory (FIG. 6I) is displayed, processing advances from the step 142 to a step 143, where the display on the LCD50 is returned to the content before the timer presetting routine 100 is executed, with the data saved in the step 102, and thereafter, this timer presetting routine 100 is terminated by a step 144.

According to the steps 141 to 143, the character program retained by timer presetting can be thus viewed.

Other Processing

When any of the fourth and subsequent items is selected by moving the cursor from the states shown in FIGS. 6A to 6C or scrolling the display screen and the decision key KE is depressed, processing advances from the step 111 to the step 122 via the steps 112 and 121, and further to a step 150, and the fourth and subsequent items are executed.

More specifically, when "4. CONFIRMATION OF PRESETTING" is selected and the decision key KE is depressed, the time of day for timer presetting and the program name of character program which have been set in the steps 131 to 132 are displayed on the LCD50, and the content of the setting can be confirmed. When "5. DELETING THE MEMORY FOR PRESET PAGE" (not shown) is selected and the decision key KE is depressed, "YES" or "NO" is confirmed, and if "YES" is confirmed, all the character program data retained in the RAM24 (retained by timer presetting) are deleted and the timer flag TFLG is also set to "0".

SUMMARY

As described above, according to a FM receiver described above, when character broadcasting is retained by timer presetting, the character program data is arranged to be retained with one character program as a unit, and therefore, the amount of character program data to be retained is reduced. Accordingly, the memory area for reception buffer will not become reduced even if the RAM24 is used as both the reception buffer and the save area for character data during timer presetting as described above, and therefore, reception waiting time for character program will not become long.

And yet, since the RAM24 is used as both the reception buffer and the save area for character data during timer presetting, the cost is not increased. In addition, since no hardware is added, the cost is not increased either in this respect. Further, since only desired character programs are retained by timer presetting with one character program as a unit, any unnecessary character program is not displayed when the character program retained is called and displayed.

In the step 132 or the step 142, when the user intends to input a program name in the timer presetting or the selection of the character program displayed, it takes time and labor, and a method of inputting characters of the program name poses a problem. The above-described receiver, however, is adapted to extract the data of the program name from the main menu data, and to use the data for displaying the program name, and therefore, it is not necessary to input the program name, nor are any key for inputting the program name and the like required.

Others

In the step 204, the data for date is obtained from the clock circuit 28 on retaining the character program data in the RAM24, but this data for date can be also obtained from the time service broadcast by text-based multiplex broadcast.

According to the present invention, since the amount of character program data to be retained by timer presetting is reduced, for example, the memory in the reception buffer for retaining character program data can be used also as a memory for retaining character program data during timer presetting. And yet, in this case, the memory area for reception buffer will not become reduced, nor will the reception waiting time for character program become long.

Further, the cost is not increased. When a character program retained is called for displaying, any unnecessary character program is not displayed. Furthermore, when a character program is selected, it becomes unnecessary to input the program name, and also a key and the like for inputting the program name are not required.

In this respect, FIG. 11A, FIG. 11B, FIG. 11C, FIG. 11D, FIG. 11E, FIG. 11F, FIG. 11G, FIG. 11H, and FIG. 11I show the English version of the display content on LCD50 shown in FIG. 5A, FIG. 5D, FIG. 5F, FIG. 5G, FIG. 6A, FIG. 6C, FIG. 6D, FIG. 6H and FIG. 6I, respectively.

What is claimed is:

1. A receiver for receiving text-based multiplex broadcasts in which text-based program data is multiplexed with an audio broadcast program signal and the resulting multiplexed signal is broadcast, said receiver comprising:

a receiving circuit for receiving said text-based multiplex broadcasts;

a decoding circuit for extracting said text-based program data from said text-based multiplex broadcasts received by said receiving circuit;

a display element for displaying said text-based program data obtained from said decoding circuit;

a timer for presetting a preset time to carry out a retention of said text-based program data;

a memory; and control means for designating, when a timer presetting operation is performed using said timer during reception of a broadcasting station which is broadcasting a selected text-based program, data indicating said preset time, frequency data indicating a frequency of said broadcasting station, and data indicating said selected text-based program to retain in said memory, for further designating, when the timer preset time arrives, said frequency data retained in said memory provided to said receiving circuit for selecting a broadcasting station, and a selected text-based program data from received text-based program data to retain in said memory in accordance with said data indicating said selected text-based program, and for further designating, when a retained program calling operation is performed, to read out a retained text-based program data from said memory and display said retained text-based program data on said display element.

2. The receiver for receiving text-based multiplex broadcasts as defined in claim 1, wherein said control means extracts, when at least one of said timer presetting operation and said retained program calling operation is performed, data for each program name from main menu data of said text-based multiplex broadcasts, and said control means displays said each program name of a plurality of text-based programs on said display element using the data of said each program name thus extracted, and said control means causes a program name of said selected text-based program to be designated from among said program names displayed, and reads only said selected text-based program data corresponding to said designated program name from said memory.

3. The receiver for receiving text-based multiplex broadcasts as defined in claim 1, wherein said control means designates said selected text-based program data to share said memory with said data indicating said selected text-based program by said timer presetting and said received text-based program data.

* * * * *